Dec. 1, 1970 B. S. HOAGLAND ET AL 3,543,397

MAGNETIC MEMORY ASSEMBLY METHOD

Original Filed May 3, 1965 9 Sheets-Sheet 1

INVENTORS B. S. HOAGLAND
B. KIRSCHENBAUM

BY Leo Stanger

ATTORNEY

Dec. 1, 1970 B. S. HOAGLAND ET AL 3,543,397

MAGNETIC MEMORY ASSEMBLY METHOD

Original Filed May 3, 1965 9 Sheets-Sheet 3

MAGNETIC MEMORY ASSEMBLY METHOD

Original Filed May 3, 1965 9 Sheets-Sheet 5

Dec. 1, 1970 B. S. HOAGLAND ET AL 3,543,397

MAGNETIC MEMORY ASSEMBLY METHOD

Original Filed May 3, 1965 9 Sheets-Sheet 9

United States Patent Office 3,543,397

Patented Dec. 1, 1970

3,543,397

MAGNETIC MEMORY ASSEMBLY METHOD

Bruce S. Hoagland, Red Bank, and Bernard Kirschenbaum, Elizabeth, N.J., assignors to Bell Telephone Laboratories, Incorporated, New York, N.Y., a corporation of New York Original application May 3, 1965, Ser. No. 452,773, now Patent No. 3,328,782. Divided and this application Feb. 13, 1967, Ser. No. 630,164

Int. Cl. H01f 7/06

U.S. Cl. 29—604 4 Claims

ABSTRACT OF THE DISCLOSURE

The instant disclosure sets out a process of providing conductors which extend through core apertures on one side of a memory plane and are electrically fixed to planar circuitry disposed upon the other side of said plane. Plural conductive strips containing lateral projections are interspersed between sheets of insulation to form a stacked unit. Plural apertured cores are provided on a substrate with their respective apertures exposed above the surface so that the aperture axis of each extends in a plane parallel to the major surface of said substrate. The other major surface of the substrate is provided with conductive circuitry, and holes are provided through the substrate to facilitate interconnecting. Then the stacked unit is extended through the core apertures as desired and the lateral extensions of same are forced through respective holes and secured into electrical engagement with the said circuitry.

This is a division of application Ser. No. 452,773, filed May 3, 1965, now Pat. No. 3,328,782.

This invention relates to magnetic memories using apertured magnetic cores, particularly disk-shaped cores having central apertures and forming parts of printed circuits, and has the object of improving and simplifying the winding arrangements on such apertured cores.

Apertured magnetic cores, for example disk-shaped ferrite cores having holes and exhibiting predetermined hysteresis characteristics, serve exceptionally well as memories for storing the information imparted to them by conductive windings to which they are magnetically linked. However, threading such apertured cores with the necessary conductive windings usually requires a manual operation. Naturally this constitutes a time-consuming and expensive fabricating step, especially in manufacturing printed circuit memories, where hand-threading represents a large labor and time expenditure as compared with printing the remainder of the wiring. The many techniques for overcoming these difficulties involve complex equipment or fabricating steps or require abandoning the use of apertured cores.

The disadvantages of manually threaded apertured cores are compounded in complicated memories where the number of cores and the number of windings linking each core is large. For example, in an automatic-number-identification (ANI) system of a private branch telephone exchange (PBX) there are a number of ferrite magnetic cores, and as many as seventeen windings must link each core.

An object of this invention is to overcome these difficulties, particularly by improving the windings linking apertured cores.

Another object is to simplify and improve printed circuit boards having a plurality of memory cores, as well as to improve the methods for threading toroidally-shaped cores.

These objects are achieved, in whole or in part, by supporting each core upon the printed circuit board with its axis parallel to the board while exposing its opening, and threading each core with an elongated multilayer conductor-insulator laminate whose conductors connect to respective terminals. According to another feature of the invention, many cores can be threaded simultaneously by shaping the multilayer laminate into elongated fingers and arranging the core axes to register with the fingers. For connection to respective terminals on the board each of the plurality of conductive layers in each finger includes an offset near one of the terminals.

These and other features of the invention are particularly pointed out in the claims forming a part of this specification. Other objects and advantages of the invention will be pointed out or will become obvious from the following detailed description when read in light of the accompanying drawings, wherein:

Figure 1:
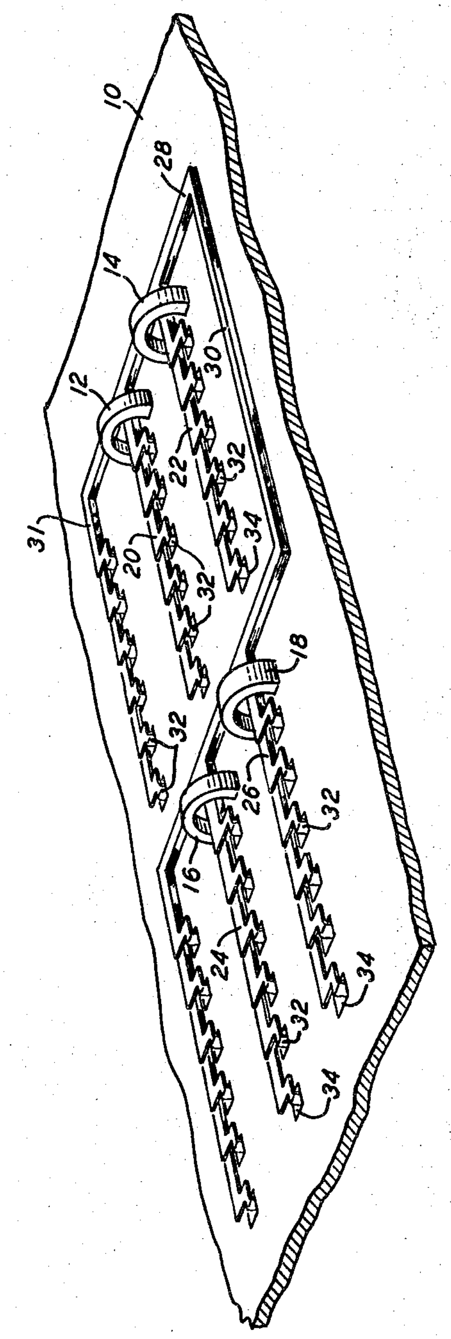
FIG. 1 is a perspective, partially cut-away view showing part of a printed circuit board having magnetic core devices threaded according to principles of the invention.

In FIG. 1 a printed circuit board 10 holds four apertured, disk-shaped cores 12, 14, 16, and 18 by portions of their peripheries and so that their central holes are exposed but dip slightly below the top surface of the board. The cores are made of ferrite having predetermined, for example rectangular, hysteresis characteristics. Preferably the board comprises a metal substrate covered completely with an insulating layer of epoxy resin. The cores 12, 14, 16, and 18 are mounted on the board as described in the Pat. No. 3,377,699, issued Apr. 16, 1968. This type of mounting involves press fitting a portion of each core periphery into a rectangular opening in the bare metal substrate of the board 10 before coating the board 10 and the cores with epoxy resin in a fluidized bed. The epoxy then coats the metal substrate as well as the exterior and interior surfaces of cores 12, 14, 16, and 18, thus leaving exposed the openings in the cores.

Figure 1A:
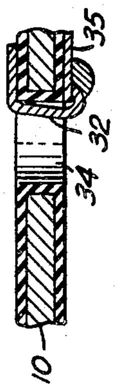
FIG. 1A is a cross-sectional view showing the connection of an offset of the laminate to the printed circuit on the other side of the board.
Figure 2:
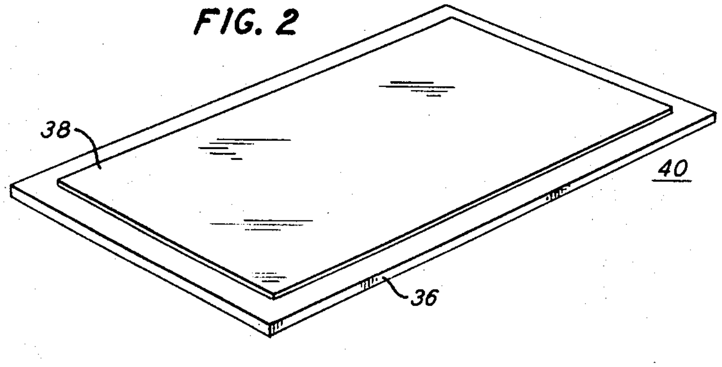
FIG. 2 illustrates perspectively a portion of the parts from which the laminate windings of FIG. 1 are manufactured.

Passing through each of the cores 12, 14, 16, and 18 are four parallel fingers 20, 22, 24, and 26 that extend from a C-shaped trunk 28 and form therewith a single laminate structure 30. An extra finger 31 passing through no core also extends from the portion 28 to form part of the structure 30. The laminate structure 30 comprises six overlying layers bonded together. Each layer in turn comprises one conductive metallic foil and one insulating Mylar film to which it is bonded. Each foil-Mylar layer extends throughout the trunk 28. Each foil-Mylar layer terminates in the fingers 20, 22, 24, 26, and 31 at respective rectangular offsets 32. The offset 32 on each layer projects through respective holes 34 on the printed circuit board 10 to the other face of the board, where the metallic foil is solder connected to terminals 35 (FIG. 1A) on the printed wiring on the other face of the board 10.

The printed wiring contacting the conductive foils in fingers 20, 22, 24, and 26 through the offsets 32 connects to separate, control, signal, inhibit or other information sources that pass suitable currents through these conductive foils to the respective foils in finger 31. Here the circuit terminals contacting the offsets 32 in finger 31 complete the respective control, signal, inhibit, and other information circuits. Currents through the foils produce fluxes that magnetically link the cores 12, 14, 16, and 18 and magnetize or demagnetize them in accordance with the signals determined by the printed circuit configuration. The structure 30 thus constitutes the windings threading the cores 12, 14, 16, and 18.

The epoxy coating on the cores 12, 14, 16, and 18 helps prevent electrical contact between the cores themselves and the foils in the fingers passing through them. The direct contact between the cores and the metal substrate of board 10 affects the magnetic characteristics only slightly.

The structure 30 is formed and connected as shown in FIGS. 2 to 7. First, as in FIG. 2, an adhesive bonds a Mylar sheet 36 to a copper foil 38 and forms therewith a laminate layer 40. Preferably, a machine prefabricates many such layers 40 simultaneously. Six different layers 40 are then selected to make up the laminate structure 30. For clarity, some of the dimensions, particularly the thicknesses, in FIG. 2 and the other figures are exaggerated.

Figure 3:
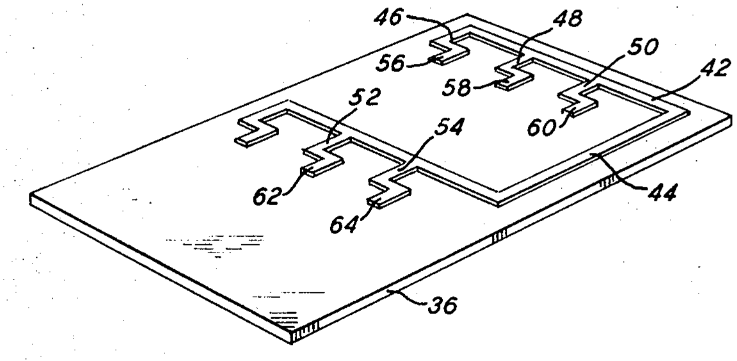
FIG. 3 is a perspective view of one laminate layer from which the laminae of FIG. 1 are etched.

Each of the six selected layers 40 is then etched to remove all the copper of foil 38 but that required to form one of the foils in the laminate structure 30 of FIG. 1. The foil shape is determined by the desired circuit connections; namely, the terminals on the board which the particular foil must contact. The result of etching the first or top foil 38 is shown in FIG. 3. Here the Mylar sheet 36 supports the copper foil 42 remaining after etching. The foil 42 includes a C-shaped handle 44 and five blades 46, 48, 50, 52, and 54. The blades 46, 48, 50, 52, and 54 terminate in offset leaves 56, 58, 60, 62 and 64.

The foil 38 in the second of the six layers 40 is etched to leave a copper foil 42 whose handle 44 and offset leaves 56, 58, 60, 62, and 64 are identical with those of the first layer 40, but whose blades 46, 48, 50, 52, and 54 are longer.

The offset leaves 56, 58, 60, 62, and 64 in each of the remaining selected layers are identical. Similarly the handles 44 are all identical. However, the length of the blades corresponding to 46, 48, 50, 52, and 54 on each layer 40 increases from layer to layer.

Figure 4:
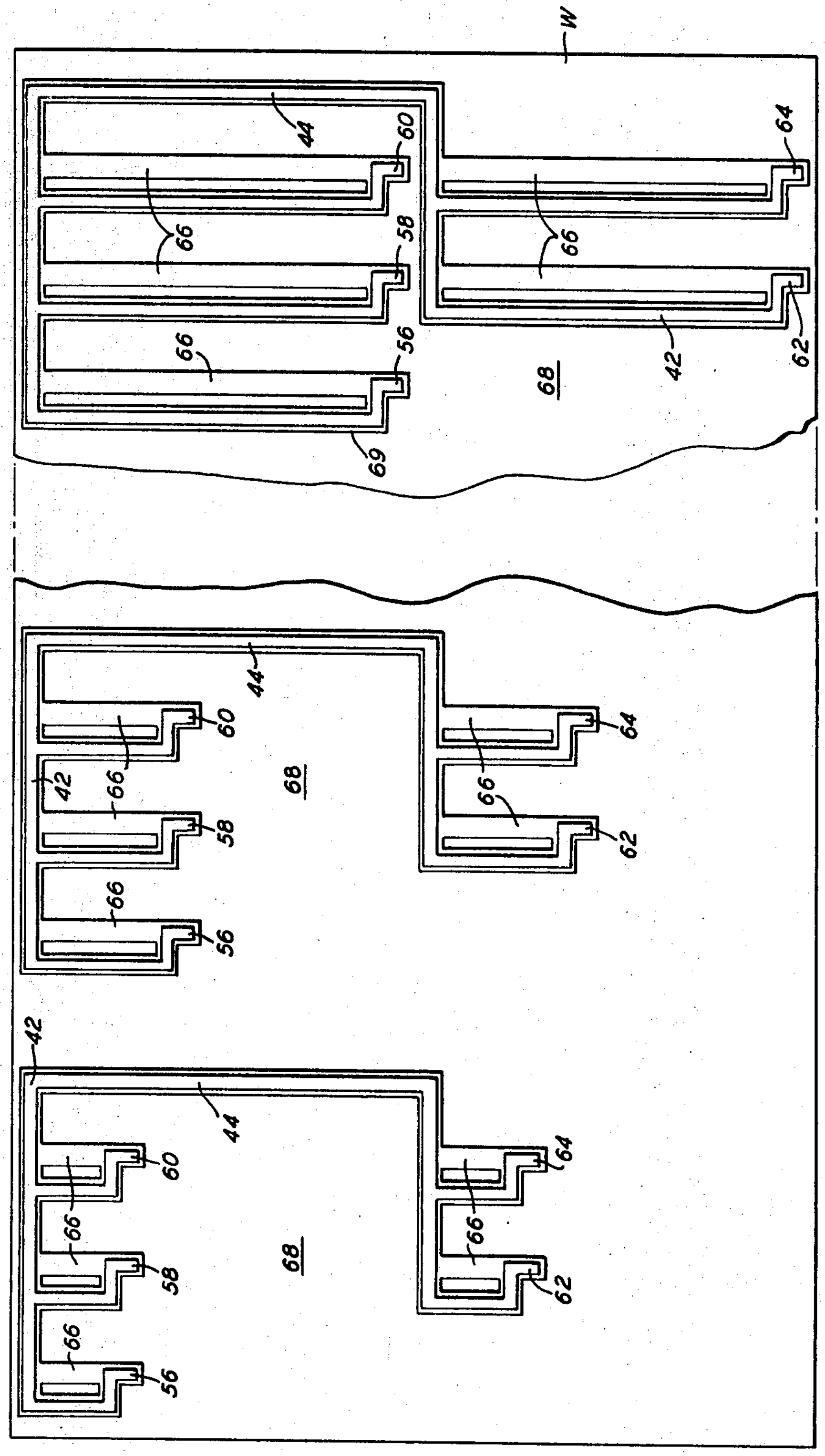
FIG. 4 is a plan view of the individual, etched, laminate layers which together form the laminate structure of FIG. 1.

Shaping of the foils 38 is followed by etching or cutting of each of the six Mylar sheets 36 to form six laminate layers 68, of which three are shown in FIG. 4. For clarity, these layers 68 appear side by side on a workface W. In each Mylar sheet the Mylar generally follows the outline of the copper foil 42 but extends slightly beyond the foil edges to form insulating ridges 69. In addition there remains of the etched sheet 36 five Mylar extension strips 66 under respective offsets 56, 58, 60, 62, and 64 of each sheet. Here the extension strips 66 all project integrally from the Mylar below the handle 44 in foil 42, beyond the ends of the offsets 56, 58, 60, 62, and 64, until they project as far as the longest blade in all layers 68. The insulating ridges 69 protect the foil from electrical shorts. While the layers 68 and their parts differ slightly from each other, they nevertheless, for simplicity, carry the same general reference numeral.

The six etched laminate layers 68 are then assembled and aligned so that the identical C-shaped handles 44 and strips 66 lie one over the other. The layers 68 having the shorter blades are placed over the layers having the longer blades. In each of the laminate layers 68 the blades are long enough to assure that their offset leaves 56, 58, 60, 62, and 64 clear the offset leaves of every other layer. The six layers 68 are bonded to each other to form the laminate structure 30 with fingers 20, 22, 24, 26, and 31 as shown in FIG. 1.

Figure 5:
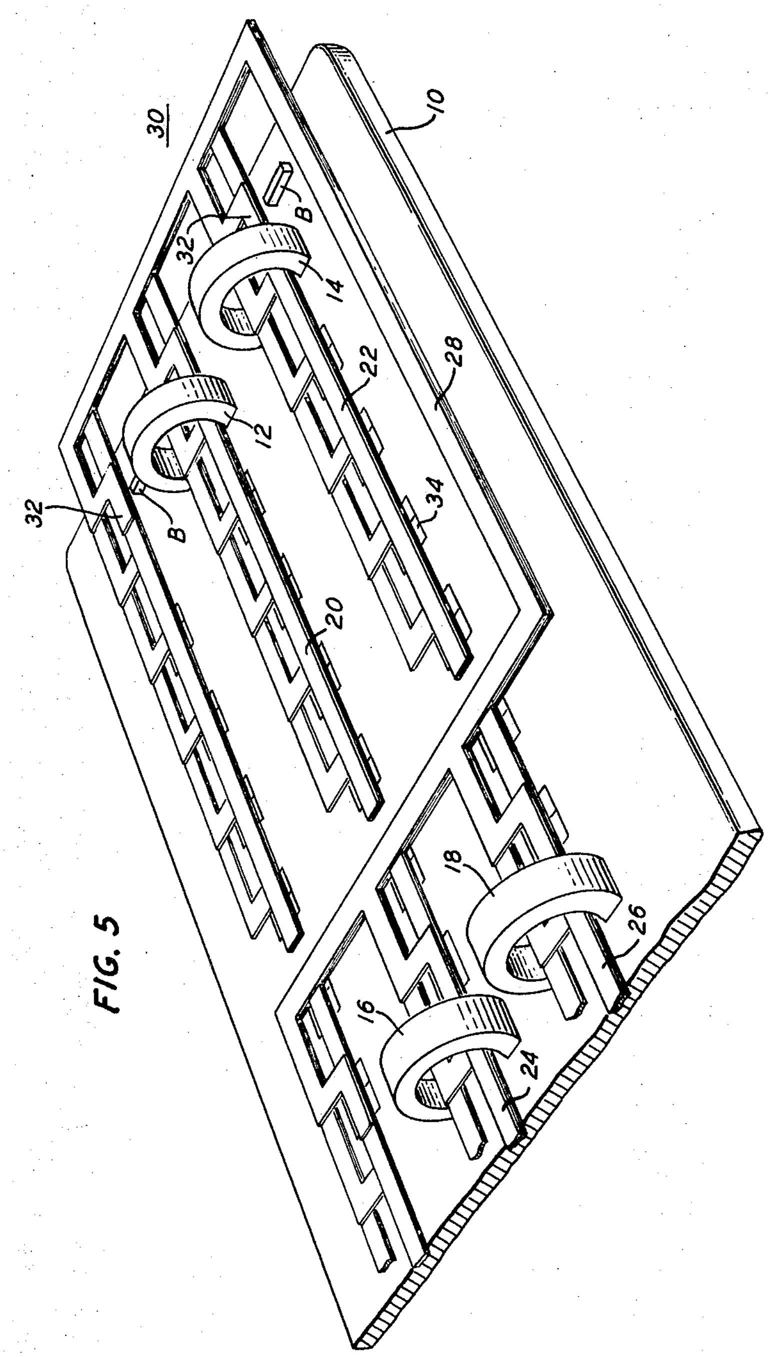
FIG. 5 is a perspective view illustrating threading of the cores in FIG. 1.

An operator or machine simultaneously inserts the fingers 20, 22, 24, and 26 of the laminate 30 into the cores 12, 14, 16, and 18 as shown in FIG. 5. The finger 32 slides over the board 10. A pair of bosses B and B′ in the path of the trunk 28 stops the inserting motion and effectively aligns the lateral angular positions of the fingers 20, 22, 24, 26, and 31 on the board. This alignment is assured by the fact that the fingers are flat and move with only one degree of freedom. They cannot move independently from side to side.

When the laminate structure 30 has been completely inserted and rests against the bosses B and B′, each of the offset leaves 56, 58, 60, 62, and 64 on each layer 68 overlies one of the prepunched holes 34 in the printed circuit board 10. The position of the holes 34 conforms to the lengths of the blades in each layer. Suitable printed wiring on the other side of the board terminates at each hole 34. The fingers 20, 22, 24, 26, and 31 are now glued lightly into position on the board 10.

Figure 6:
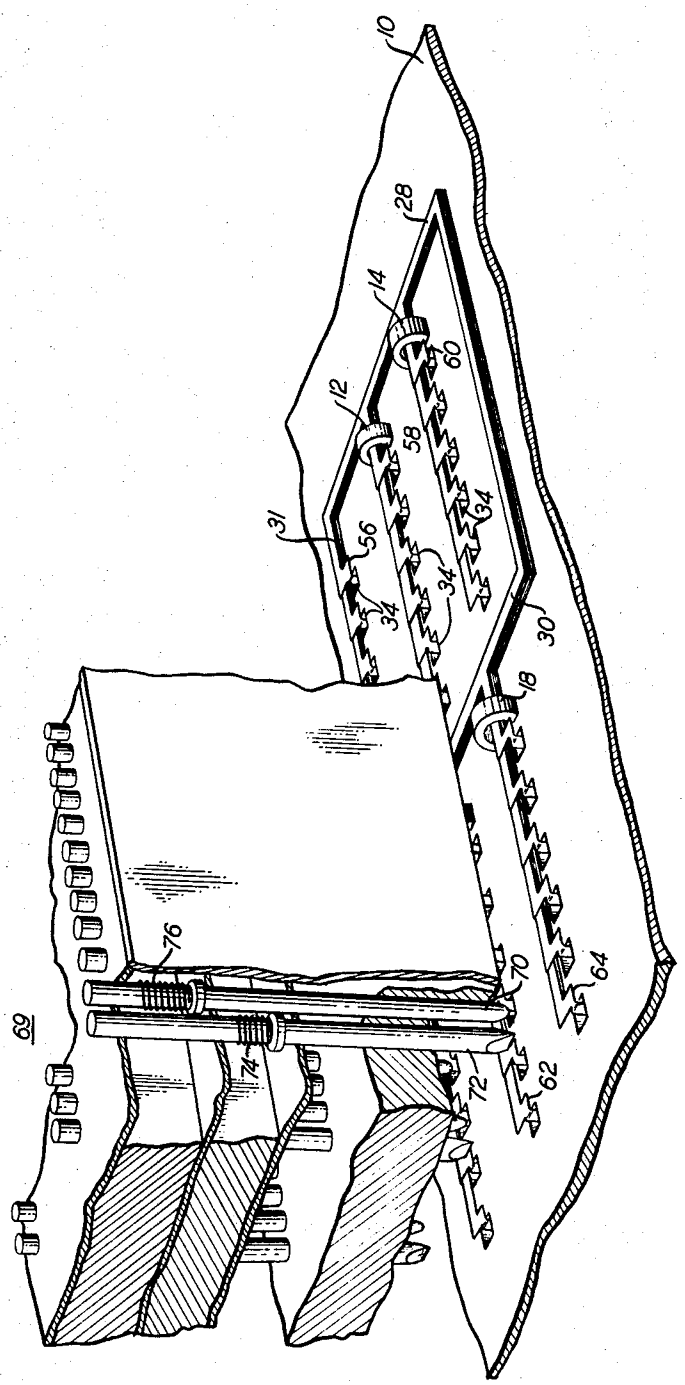
FIG. 6 illustrates perspectively the printed circuit board of FIG. 1 and a view of a machine adapted to help connect the threaded conductors.

In FIG. 6 a machine 69 severs the extension strips 66 behind and ahead of each offset leaf 56, 58, 60, 62, and 64 and pokes the end of each offset leaf through the hole 34 below it. The machine 69 includes a plurality of aligned and alternate poking rods 70 and cutting chisels 72. In operation the board 10 is placed in a jig to align the holes 34 with the rods 70. The machine 69 then descends and by means of suitable springs 74 and 76 assures that only proper force is applied to the rods and chisels.

Figure 7:
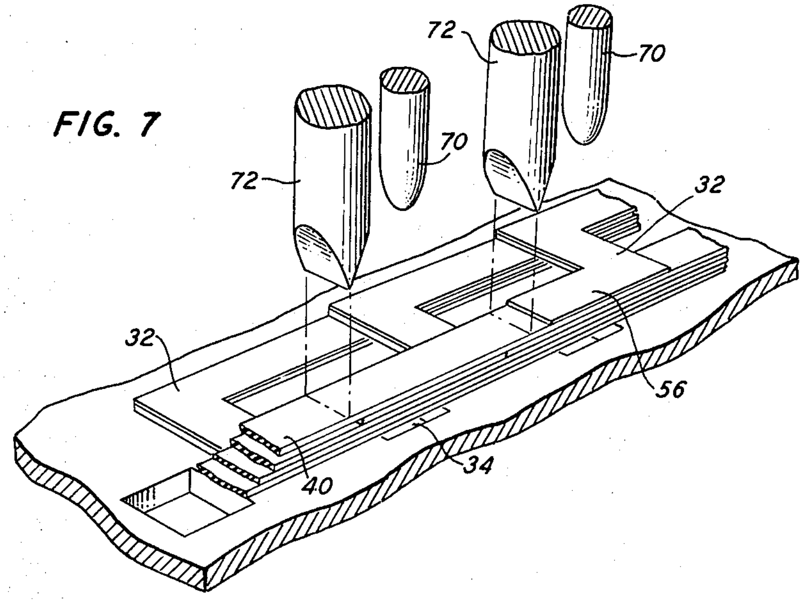
FIG. 7 is a detailed view illustrating operation of the machine in FIG. 6.
Figure 8:
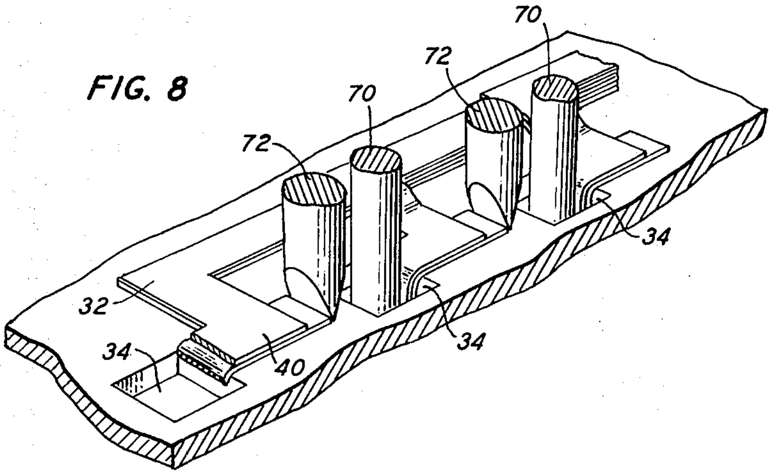
FIG. 8 is a detailed perspective view also illustrating operation of the machine in FIG. 6.
Figure 9:
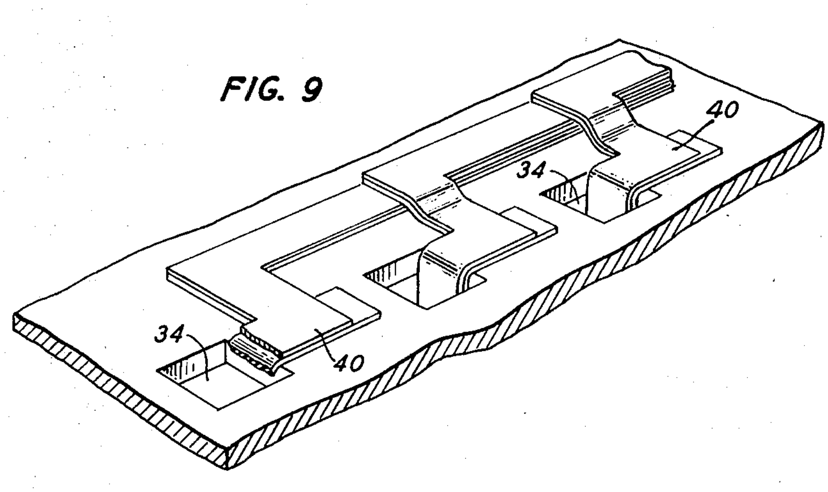
FIG. 9 is a detailed perspective view of FIG. 1 showing the results of the machine in FIG. 6.

The operation of the rods 70 and chisels 72 appears in detail in FIGS. 7, 8, and 9 with respect to finger 31. The operation is simultaneous and identical with that of the other fingers 20, 22, 24, and 26, not shown in FIGS. 7, 8, and 9. In FIG. 7 the poking rods 70 approach the respective holes 34 while the knife edges of chisels 72 approach the Mylar strips 66 supporting the offset leaves 56, forming part of the offsets 32. In FIG. 8 the chisels 72 and the poking rods 70 descend and simultaneously cut the strips 66 while poking the offset leaves 56 through the holes 34, as shown in FIG. 8. When the machine 69 withdraws, the result appears as in FIG. 9, the latter being in detail of FIG. 1.

The offset leaves 56, 58, 60, 62, and 64 forming part of the respective offsets 32 are connected to the circuit terminals at the respective holes 34 by dipping the underside of board 10 into a molten solder bath according to well-known mass solder techniques. The molten solder first strips the conductive foils of their Mylar insulation in the vicinity of the terminals by vaporizing the Mylar. The solder then contacts the terminals and the offset leaves 56, 58, 60, 62, and 64. When the solder bath is removed, the solder connecting the leaves and terminals remains. The solder now cools and conductively bonds the leaves 56, 58, 60, 62, and 64 to the terminals at holes.

The laminate structure 30 permits threading a number of cores with many windings simultaneously. Whereas the drawings illustrate threading of only four cores at one time, the invention affords the opportunity of threading several dozen cores simultaneously with a simple technique to accomplish a result that hitherto required considerable manual labor. A particular advantage accruing from the flat structure of the laminate offsets arises in the fact that the fingers 20, 22, 24, 26, and 31 and the leaves 56, 58, 60, 62, and 64 of the offsets 32 have freedom of movement in only one plane and are restricted from moving from side to side. Thus, the poking rods 70 are always assured of finding their targets, i.e., the leaves 56, 58, 60, 62, and 64, in proper position.

Figure 10:
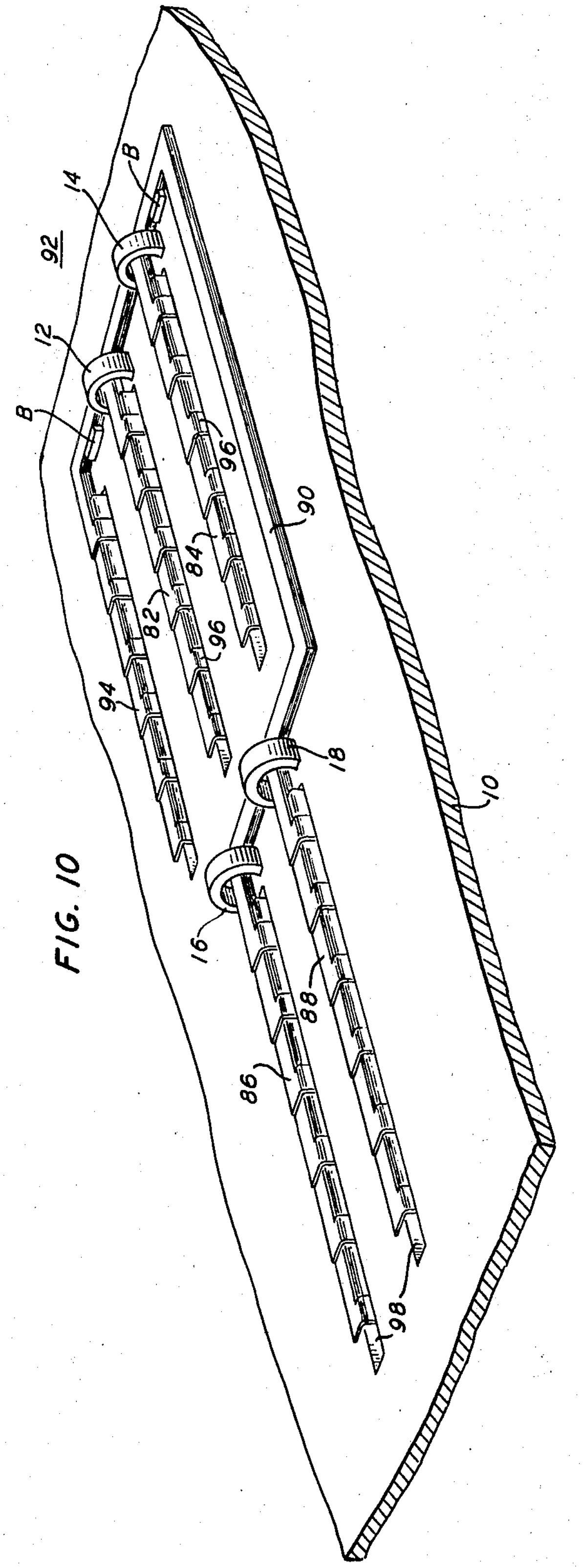
FIG. 10 is a perspective view illustrating another embodiment of the invention.

Another embodiment of the invention appears in FIG. 10. Here the board 10 again supports four cores 12, 14, 16, and 18. Passing through these cores are four laminate fingers 82, 84, 86, and 88, each projecting from a C-shaped trunk 90 similar to the trunk 28 of FIG. 1 to form a laminate structure 92 that also includes a fifth finger 94. As in FIG. 1, the laminate structure 92 comprises six overlying layers, each layer comprising a conductive metal foil supported from below by Mylar insulation. Again each foil Mylar layer extends throughout the trunk 90. Each layer terminates in the fingers 82, 84, 86, 88, and 94 at respective tabs 96 that project through four parallel slots 98. The foil in each tab 96 connects to suitable terminals that meet the tabs at positions along the slots 98 on the opposite side of the board 10.

As in FIG. 1, the terminals on the opposite side of the boards form part of a printed circuit contacting the foils in fingers 82, 84, 86, 88, and 94 to pass suitable currents through the foils. Currents through the foils link the cores magnetically to magnetize or demagnetize them according to the signals determined by the printed circuit configuration.

Figure 11:
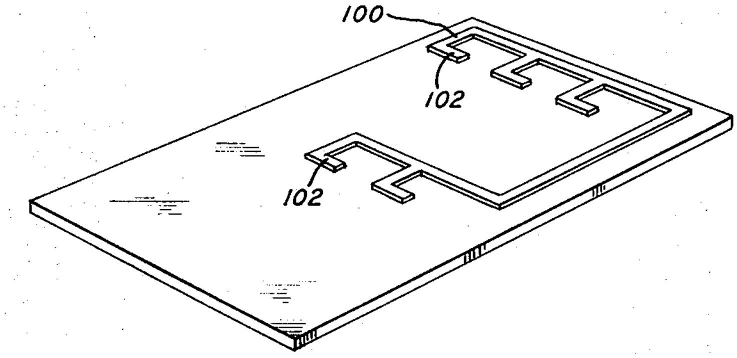
FIGS. 11 and 12 are perspective views of some of the individual, etched layers forming the laminar structure in FIG. 10.

The laminate structure 92 is formed in a manner similar to that of the structure 30. As in FIG. 2, six foils 38 are bonded to six Mylar sheets 36 to form six layers 40. However, in FIG. 11 etching the foils 38 produces resulting blades 100 that terminate only in transverse projections 102. The C-shaped handle 104 corresponds to the handle 44 of FIG. 3. Each transverse projection 102 of the blades 100 in every layer extends the same distance from its blade 100. The lengths of all the blades 100 on any one layer are the same. However, the lengths increase from the first to the sixth layer.

Figure 12:
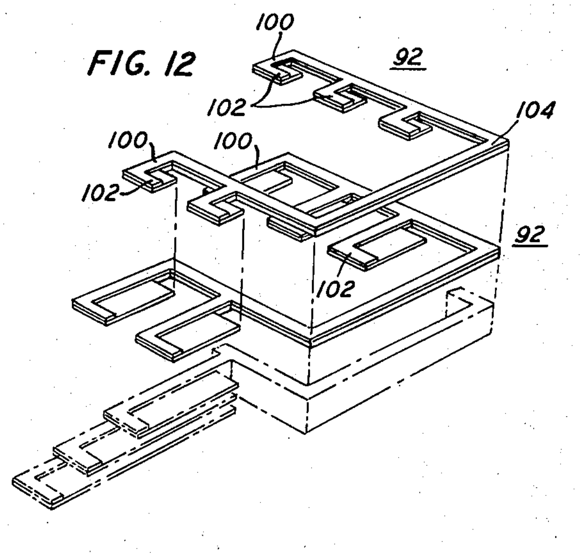

As explained in connection with FIG. 4, the operation proceeds by etching the sheet 36 to follow just beyond the outline of the etched foil about the handle 104 and the left side of the blades 100. However, at the projections 102 the Mylar continues beyond the projections toward the C-shaped main portion so that it will support not only the foil on its layer but all the projections on the layers above. The six layers are now aligned and laminated so that each C-shaped handle 104 overlies the other handles and the shanks of the blades are in alignment, as shown in the exploded view in FIG. 12.

Figure 13:
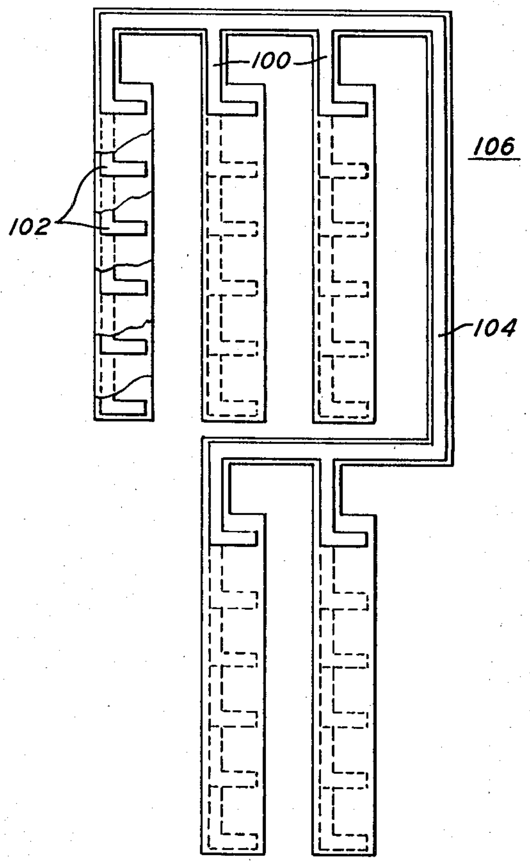
FIG. 13 is a plan view of some of the individual, etched layers suitable for the laminate structure in FIG. 10 but according to another embodiment of the invention.

Instead of etching the Mylar immediately after etching the foil it is possible to proceed by laminating the six etched-foil full-Mylar layers together and then punching the resulting structure so that each Mylar sheet in each finger is as long as the longest finger and as wide as each blade 100 and each projection 102 combined. This is shown in FIG. 13. With this structure 106 the remaining operation is the same as with that shown in FIG. 12.

Figure 14:
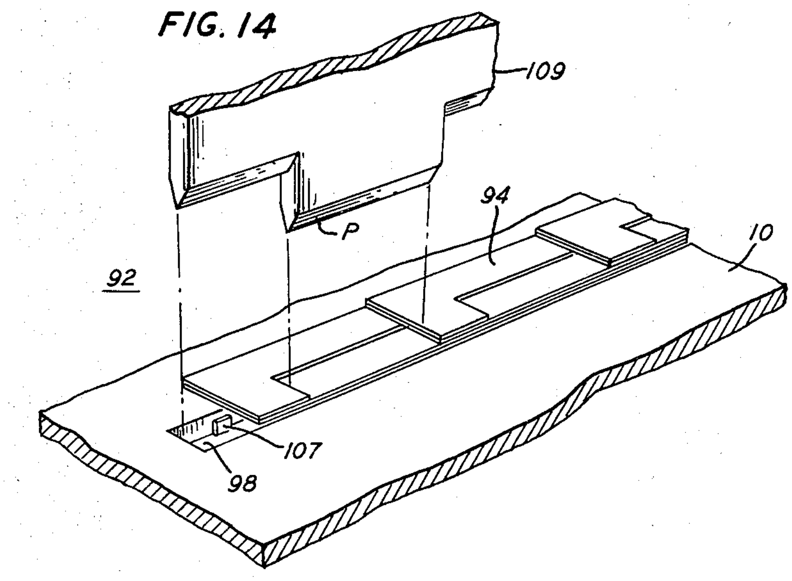
FIG. 14 is a perspective view of a step in connecting the laminate in FIG. 10.

The laminate structure 92 or 106 is then passed through the cores 12, 14, 16, and 18 until the trunk 90 abuts two bosses B and B′ on the board 10. Each finger on the structure 92 or 106 now assumes the position above a slot 98 as shown in FIGS. 10 and 14. When the laminate 92 has been completely inserted, each of the projections 102 on each layer overlies an elongated slot 98 in the printed circuit board 10.

Suitable printed wires 107 on the other side of the board 10 pass upwardly through the slot 98 at longitudinal points along the slot 98. They terminate as they reach the top side of the board just below the respective projections 102. On the inside wall of each slot 98 and opposite each wire termination is an unconnected printed wire spot that serves as an anchor for solder flow.

The fingers 82, 84, 86, 88, and 94 are now glued lightly into the position shown for one finger 94 in FIG. 14. The tabs 96 are now passed to the opposite side of the board 10 by placing the board in a jig, not shown, and pushing the tabs 96 through the slots 98 with elongated mandrels 109 that fit into slots 98. The mandrels 109 lead with protuberances P that fit between the foil projections 102.

The foil projections 102 in the tabs 96 are connected to the circuit terminals at the respective slots 98 by dipping the underside of the board into a molten solder bath according to the well-known mass solder techniques. Preferably this is done at a time when the protuberances P of mandrels 109 are still in the slots 98. The molten solder first strips the conductive foil projections 102 of their Mylar insulation in the vicinity of the terminals by vaporizing the Mylar. Solder pools then join the foil projections 102 with the respective wire terminations and printed spots in the slots. When the board is removed from the solder bath and the mandrels withdrawn, the solder pools cool and join the foil projections 102 with the respective wire terminations and spots.

The purpose of leaving the protuberances P of the mandrels 109 in the slots 98 during the mass soldering operation is to prevent a single solder pool from forming and joining each of the foil projections 102 passing through each slot 98 to each other. With proper soldering techniques no protuberances P are necessary on the mandrel 109.

This embodiment, as the first, permits threading many conductive windings through each core while simultaneously threading the other cores while at the same time placing the conductors in such a position as to assure accurate connection to the proper terminals.

Figure 15:
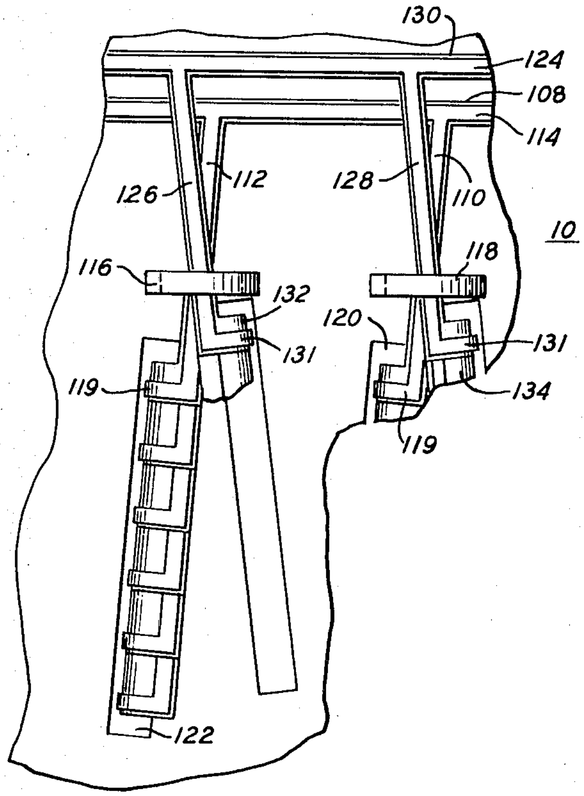
FIG. 15 is a plan view showing details of another embodiment of the invention.

Another embodiment of the invention affording the possibility of threading the cores with more windings within a limited space is illustrated in part in FIG. 15. Here in a detail plan view of a circuit board, a laminate structure 108 possesses fingers 110 and 112 extending angularly from a trunk 114 and through two cores 116 and 118 corresponding to the cores 16 and 18. Six tabs 119 in the fingers 110 and 112 pass through angular slots 120 and 122 in the manner corresponding to the tabs 96 passing through the slots 98 in the board 10. The foils of the tabs 110 connect to terminals (not shown) on the underside of the board 10. A laminate structure 124 also corresponding to the laminate structure 92 possesses fingers 126 and 128 projecting angularly from a trunk 130 in the direction opposite to the fingers 110 and 112 and overlying the fingers 110 and 112 while passing through the cores 116 and 118. Again here, tabs 131 on the fingers 126 and 128 corresponding to the tabs 96 pass through slots 132 and 134. These slots extend angularly to the slots 120 and 122. The conductive foils in the tabs 129 connect to terminals (not shown) on the other side of the printed circuit board 10. This structure furnishes additional windings without excessive use of space on the board 10.

While only a limited number of cores are illustrated in FIG. 15, the invention contemplates a larger number of cores, the ones shown being merely exemplary and a detail of a larger circuit board.

In FIG. 15 the operation is substantially the same as for the structure 92 in FIG. 10, and the mass soldering techniques can also be the same. For clarity the angles at which the fingers project from the trunks have been exaggerated in FIG. 15.

While embodiments of this invention have been described in detail, it will be obvious to those skilled in the art that the invention may be embodied otherwise without departing from its spirit and scope.

What is claimed is:

1. A method of forming a core assembly comprising the steps of:

mounting cores having central openings therein on a planar support with the openings of the cores exposed above one face of the support;

applying conductive paths to the other face of the support, the conductive paths extending adjacent to one or more holes in the support;

stacking a plurality of multilength conductive strips having lateral projections at one end into a laminate having insulating strips interleaved between the conductive strips;

inserting the laminate through the central opening of at least one core;

inserting the lateral projections of the laminate through at least one hole in the support; and joining the conductive paths of the lateral projections to the conductive paths on the other face of the support.

2. A method of forming a core assembly comprising the steps of:

mounting magnetic cores having central openings therein on a planar support with the openings of the cores exposed above one face of the support;

depositing conductive paths on the other face of the support, the conductive paths extending adjacent to one or more holes in the support;

assembling a plurality of progessively shorter conductive strips having lateral projections at one end thereof into a laminate in which the other ends of the conductive strips commence from a common point and insulating strips are interleaved between the conductive strips;

inserting the laminate through the central opening of at least one core;

inserting the lateral projections of the laminate through at least one hole in the support; and joining the conductive paths of the lateral projections to the conductive paths on the other face of the support.

3. A method of forming a core assembly comprising the steps of:

mounting magnetic cores having central openings thereon a planar support, the cores being mounted with the openings exposed above one face of the support;

applying conductive paths to the other face of the support, the conductive paths extending adjacent to a plurality of holes in the support;

assembling a plurality of conductive strip members having fingers of progressively shorter length and lateral projections at the ends of the fingers into a laminate having insulating strip members interleaved between the conductive strip members;

inserting fingers of the laminate through the central openings of the cores;

inserting the lateral projections of the fingers through the holes in the support; and joining the conductive paths of the lateral projections to the conductive paths on the other face of the support.

4. A method of forming a core assembly comprising the steps of:

mounting cylindrical magnetic cores having axial openings therein on a planar support, having a plurality of holes extending therethrough, the cores being mounted with the openings therein exposed above one face of the support;

depositing conductive paths on the other face of the support, the conductive paths extending adjacent to the holes in the support;

assembling a plurality of conductive strip members having fingers of progressively shorter length and lateral projections at the ends of the fingers into a laminate in which the fingers commence from a common point and insulating strip members are interleaved between the conductive strip members;

inserting fingers of the laminate through the axial openings in the cores;

inserting the lateral projections of the fingers through the holes in the support; and joining the conductive paths of the lateral projections to the conductive paths on the other face of the support.

References Cited

UNITED STATES PATENTS

| | | | |
|---|---|---|---|
| 3,009,010 | 11/1961 | Stearns et al. | 174—72 |
| 3,021,507 | 2/1962 | McFarland | 340—174 |
| 2,910,673 | 10/1959 | Block et al. | 340—174 |
| 3,025,502 | 3/1962 | Gellet | 340—174 |
| 3,068,554 | 12/1962 | Pouget. | |
| 3,196,522 | 7/1965 | Bernstein et al. | 29—604 |
| 3,197,746 | 7/1965 | Stroehr et al. | 29—604 |
| 3,293,620 | 12/1966 | Renard | 340—174 |
| 3,391,397 | 7/1968 | Birt et al. | 340—174 |

JOHN F. CAMPBELL, Primary Examiner

R. W. CHURCH, Assistant Examiner

U.S. Cl. X.R.

29—433, 624, 625, 628; 174—68.5, 72; 317—101; 339—17